(12) United States Patent
Shenouda

(10) Patent No.: US 10,228,305 B2
(45) Date of Patent: Mar. 12, 2019

(54) SHAFT SHEAR DETECTION THROUGH SHAFT OSCILLATION

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/710,584

(22) Filed: Sep. 20, 2017

(65) Prior Publication Data

US 2018/0010980 A1 Jan. 11, 2018

Related U.S. Application Data

(63) Continuation-in-part of application No. 14/997,913, filed on Jan. 18, 2016.

(51) Int. Cl.
*G01M 13/02* (2006.01)
*G01M 15/14* (2006.01)
*F01D 21/06* (2006.01)
*F01D 21/04* (2006.01)
*F02C 3/04* (2006.01)
*G01M 13/028* (2019.01)
(Continued)

(52) U.S. Cl.
CPC ......... *G01M 13/028* (2013.01); *F01D 21/045* (2013.01); *F01D 21/06* (2013.01); *G01L 5/00* (2013.01); *G01M 15/14* (2013.01); *F01D 21/003* (2013.01); *F01D 21/04* (2013.01); *F02C 3/04* (2013.01); *F02C 9/46* (2013.01); *F02K 3/06* (2013.01); *F05D 2220/323* (2013.01); *F05D 2240/60* (2013.01); *F05D 2270/091* (2013.01); *F05D 2270/334* (2013.01); *F05D 2270/80* (2013.01); *F05D 2270/81* (2013.01)

(58) Field of Classification Search
CPC ....... G01H 1/003; G01H 1/006; G01M 15/14; F01D 21/06; F01D 21/04; F01D 21/045; F05B 2270/80; F05B 2270/091
See application file for complete search history.

(56) References Cited

U.S. PATENT DOCUMENTS 4,833,405 A 5/1989 Richards et al.
5,293,774 A 3/1994 Ratherham
(Continued)

FOREIGN PATENT DOCUMENTS

FR 2921974 4/2009
GB 2488805 12/2012
JP 2007108189 4/2007

OTHER PUBLICATIONS

European Search Report, dated May 18, 2017, 7 pages, EP Application No. 17152036.4.

*Primary Examiner* — Blake A Tankersley
*Assistant Examiner* — Leo T Hinze
(74) *Attorney, Agent, or Firm* — Norton Rose Fulbright Canada LLP

(57) ABSTRACT

There is described a shaft shear event detection method. The method comprises obtaining a demodulated waveform of a shaft oscillation wave superimposed on a shaft rotational speed signal, comparing the amplitude to an amplitude threshold, detecting oscillation when the amplitude threshold is exceeded for a plurality of samples, and detecting a shaft shear when oscillation continues for a predetermined time limit.

13 Claims, 10 Drawing Sheets

(51) Int. Cl.
*G01L 5/00* (2006.01)
*F02K 3/06* (2006.01)
*F02C 9/46* (2006.01)
*F01D 21/00* (2006.01)

(56) References Cited

U.S. PATENT DOCUMENTS

| | | |
|---|---|---|
| 6,445,995 B1 * | 9/2002 | Mollmann .............. G01H 1/006 |
| | | 235/103 |
| 6,494,046 B1 | 12/2002 | Hayess |
| 7,743,658 B2 | 6/2010 | Filbry |
| 7,860,665 B2 * | 12/2010 | Parrish .................... G01L 3/109 |
| | | 702/41 |
| 8,943,876 B2 | 2/2015 | Rowe et al. |
| 9,506,401 B2 | 11/2016 | Bacic et al. |
| 2012/0107094 A1 | 5/2012 | Lillis |
| 2014/0121934 A1 | 5/2014 | Dooley |
| 2016/0178464 A1 | 6/2016 | Burns et al. |
| 2016/0194977 A1 | 7/2016 | MacDonald |

\* cited by examiner

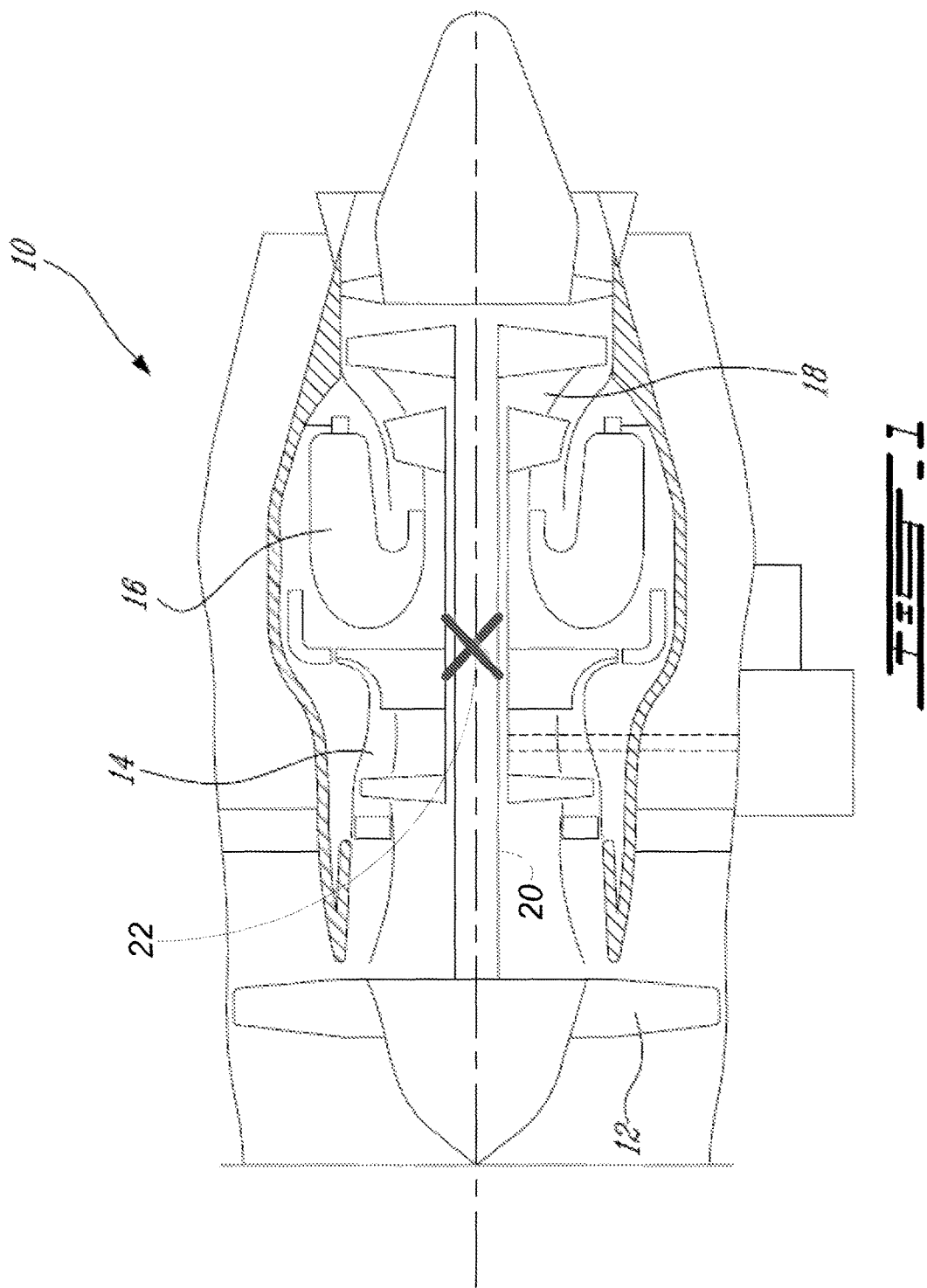

SHAFT SHEAR DETECTION THROUGH SHAFT OSCILLATION

CROSS-REFERENCE TO RELATED APPLICATIONS

This application is a Continuation-in-part of U.S. patent application Ser. No. 14/997,913 filed on Jan. 18, 2016, the contents of which are hereby incorporated by reference in their entirety.

TECHNICAL FIELD

The application relates generally to detecting shaft shears and, more particularly, to detecting shaft shears of loaded, rotating shafts, positioned between a source and a load.

BACKGROUND OF THE ART

The low pressure shaft on a gas turbine engine connects the low pressure turbine to the fan, and transfers the power from the turbine to the fan. The transferred power is then converted into engine thrust. During engine operation, the shaft experiences very high torsional loads. In the unlikely event of a shaft shear and loss of load, the fuel must be shut off quickly to prevent damage to the engine.

Several methods exist for detecting shaft shear. For example, mechanical axial detection involves using a probe or sensor adjacent to a rear end of the shaft to detect the axial motion of the shaft after the shear. The sheared shaft collides with the sensor, resulting in a fuel shutoff. Another example comprises using a processor to calculate a rate of change of shaft speed. When the rate of change falls below a certain value for a period of time, a fuel shutoff is commanded.

Methods that involve delayed indicators, such as axial displacement and axial movement, or time-consuming signal processing, such as rate of change of shaft speed, are not well-suited for a process requiring rapid fuel shutoff. In addition, methods that require special sensors or additional hardware also have certain disadvantages, such as additional cost and weight, and/or give rise to durability and reliability concerns.

There is therefore a need to improve on existing methods for detecting shaft shear.

SUMMARY

In one aspect, there is provided a method for detecting a shear of a rotating shaft positioned between a source and a load. The method comprises obtaining a demodulated waveform of a shaft oscillation wave superimposed on a shaft rotational speed signal, the waveform having an amplitude and a frequency, comparing the amplitude of the waveform to an amplitude threshold, detecting an oscillation of the shaft when the amplitude threshold is exceeded for a plurality of samples, and detecting a shear of the rotating shaft when oscillation continues for a predetermined time limit.

In another aspect, there is provided a system for detecting a shear of a rotating shaft positioned between a source and a load. The system comprises a processing unit and a non-transitory computer-readable memory having stored thereon program instructions. The instructions are executable by the processing unit for obtaining a demodulated waveform of a shaft oscillation wave superimposed on a shaft rotational speed signal, the waveform having an amplitude and a frequency, comparing the amplitude of the waveform to an amplitude threshold, detecting an oscillation of the shaft when the amplitude threshold is exceeded for a plurality of samples, and detecting a shear of the rotating shaft when oscillation continues for a predetermined time limit.

In a further aspect, there is provided a non-transitory computer-readable medium having stored thereon program instructions for detecting a shear of a rotating shaft positioned between a source and a load. The instructions are executable by a processing unit for obtaining a demodulated waveform of a shaft oscillation wave superimposed on a shaft rotational speed signal, the waveform having an amplitude and a frequency, comparing the amplitude of the waveform to an amplitude threshold, detecting an oscillation of the shaft when the amplitude threshold is exceeded for a plurality of samples, and detecting a shear of the rotating shaft when oscillation continues for a predetermined time limit.

DESCRIPTION OF THE DRAWINGS

Reference is now made to the accompanying figures in which:

FIG. 1 is a schematic cross-sectional view of a gas turbine engine;

DETAILED DESCRIPTION

Figure 2A:
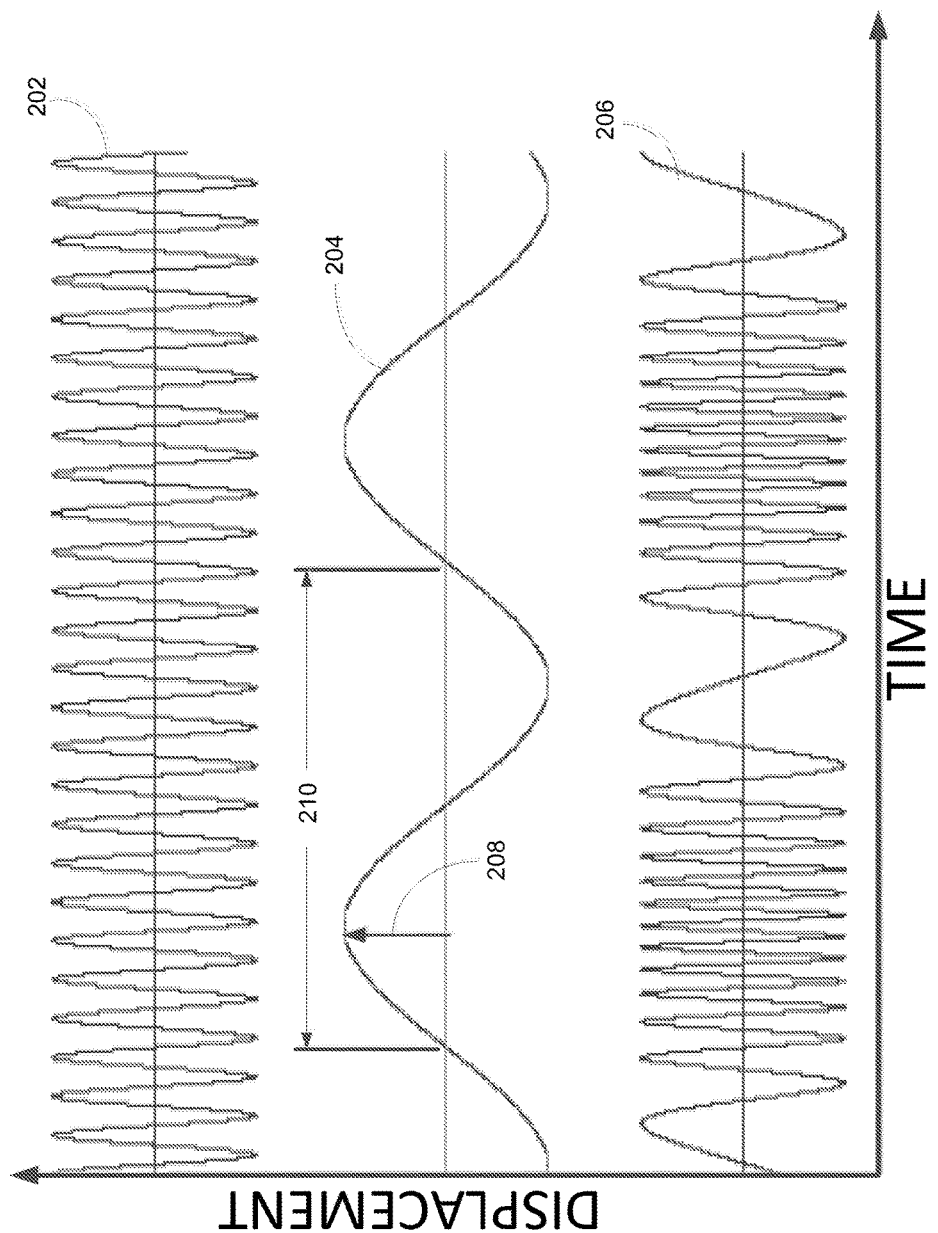
FIG. 2A is an illustration of a frequency modulation signal composition.

FIG. 1 illustrates a gas turbine engine 10 of a type that may be provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A shaft 20 is provided between the turbine 18, and the fan 12. A shaft shear 22 may occur at any point along the shaft 20. When the shaft 20 shears, the sudden unloading results in a rapid untwisting of the shaft 20. The untwisting causes a unique oscillation or ringing of the shaft 20. This ringing may be identified as a unique oscillation signature for detecting the shaft shear 22 and triggering a fuel shutoff command. Note that while the turbine engine 10 illustrated in FIG. 1 is a turbofan engine, the detection methods and systems described herein may also be applicable to turboprop engines and turboshaft engines. In addition, the teachings herein are not limited to turbine engines as a shear of any rotating loaded shaft provided between a source (such as a turbine) and a load (such as a fan) may be detected using the unique oscillation signature that results from a shaft shear event.

The shaft shear 22 manifests itself as an oscillation wave that is superimposed on the shaft speed signal and may be used as a signature indicative of a shear for a given shaft. The superimposed oscillation wave will be referred to herein as a shaft oscillation signature. The waveform that results from the oscillation wave being superimposed on the shaft speed signal, referred to herein as a resultant modulated waveform, is composed of a carrier wave and a modulating wave. The carrier wave represents the speed of the shaft before the shear, and the modulating wave represents the oscillation wave due to the sudden unloading of the shaft 20, and thus the shaft oscillation signature.

Referring to FIG. 2A, there is illustrated an example of a carrier wave 202, a modulating wave 204, and a resultant modulated waveform 206 obtained from the combination of the carrier wave 202 and the modulating wave 204. All three waves 202, 204, 206 are plotted as displacement (y axis) versus time (x axis). The carrier wave 202 is the speed of the shaft 20 before the shaft shear event. The modulating wave 204 is the oscillation of the shaft 20 immediately after the shaft shear event. It is this oscillation that is detected as a shaft oscillation signature from the resultant modulated waveform 206 in order to detect a shaft shear event.

Figure 2B:
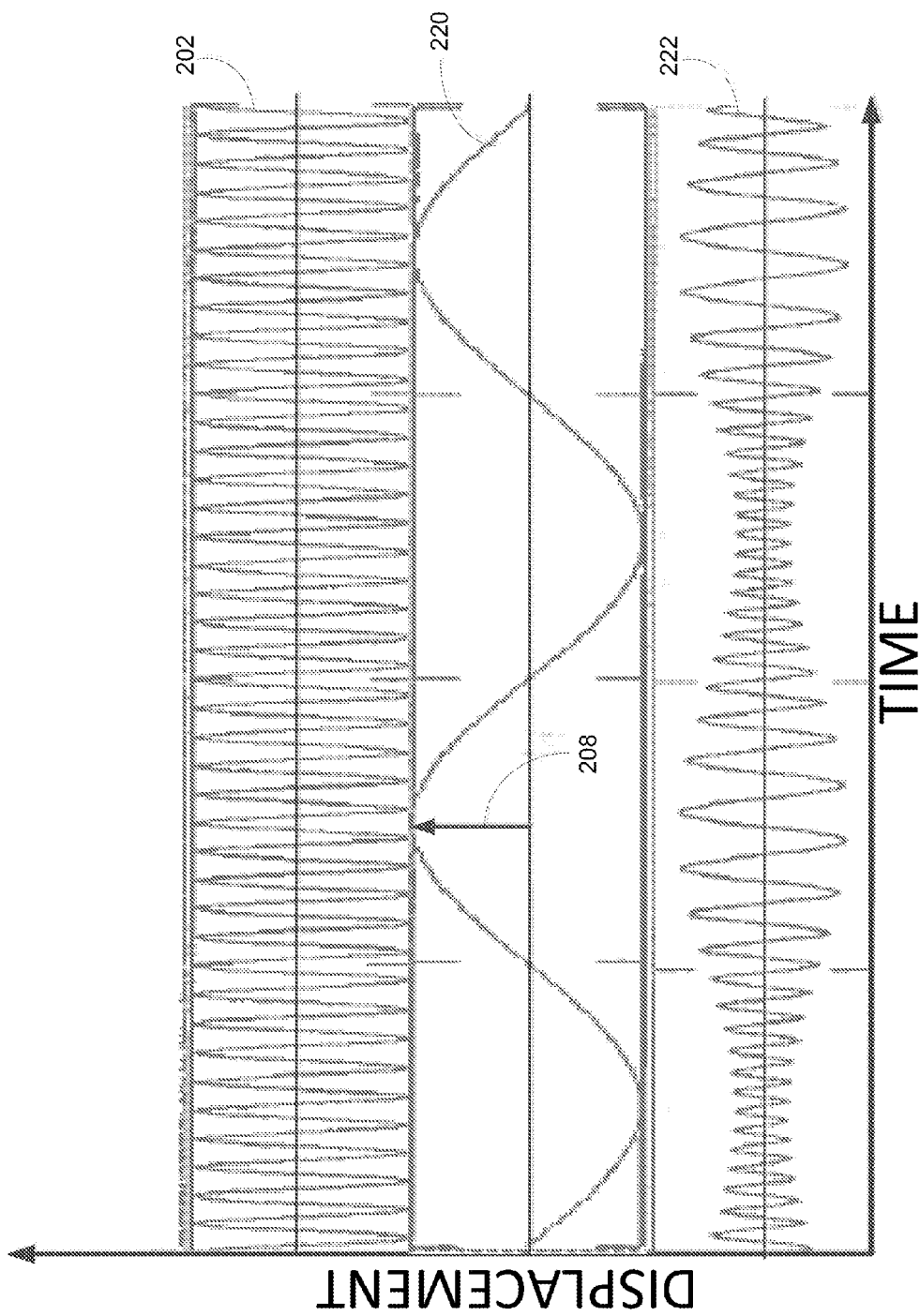
FIG. 2B is an illustration of an amplitude and frequency modulation signal composition.

In the example of FIG. 2A, the resultant modulated waveform 206 is modulated only as a function of frequency. In some embodiments, the resultant modulated waveform is modulated as a function of amplitude and frequency. An example is illustrated in FIG. 2B, where resultant modulated waveform 222 is shown to have both its frequency and its amplitude modulated as a result of the combination of carrier wave 202 and a modulating wave 220. Indeed, in some instances, shaft oscillation (i.e. changes in rotational speed) due to shear may appear as amplitude and frequency modulations superimposed on the shaft speed signal, because both the frequency and the amplitude of the waveform are a function of the rotational speed.

The level of deviation of the modulation wave 204 from the carrier wave 202 is a function of the torque experienced by the shaft 20 immediately before the shear and corresponds to the amplitude of the modulation wave 204, referred to herein as a wave modulation amplitude 208. The frequency of the modulation wave 204, referred to herein as a wave modulation frequency, corresponds to the reciprocal of the period 210. The wave modulation frequency is independent of the torque on the shaft 20 and is a function of the physical location of the shear on the shaft as well as the dynamics and physical characteristics of the rotating system. Therefore, the unique shaft oscillation signature that results from a shaft shear event may be composed of a range of possible wave modulation frequencies and wave modulation amplitudes, as a function of possible positions of shaft shear and possible torque levels applied to the shaft 20, respectively. The applicable ranges of wave modulation frequencies and wave modulation amplitudes may be determined beforehand using various modeling techniques, known to those skilled in the art. In some embodiments, the applicable wave modulation amplitudes may be determined, or narrowed from a broader range, during engine operation by measuring shaft torque or by monitoring other engine parameters from which torque may be calculated.

Figure 3:
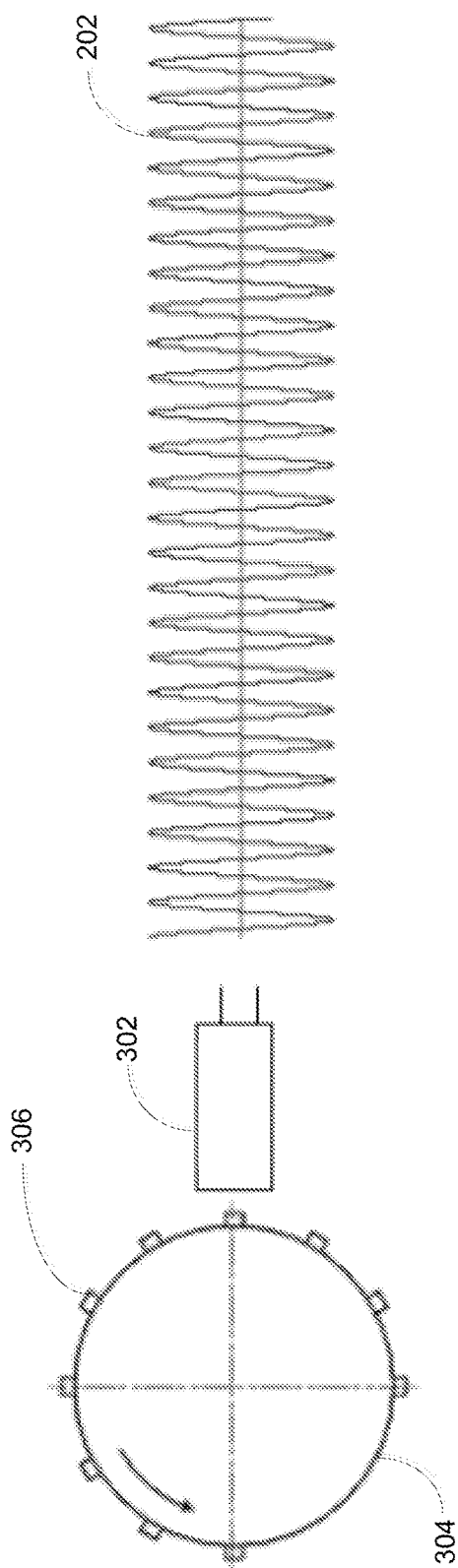
FIG. 3 is an example embodiment of a speed sensing device.

Some examples of physical characteristics affecting the dynamics of the rotating system include the shape of the shaft (including circumference and length), material properties of the shaft, damping characteristics of the rotor system, and the characteristics of the speed sensing device used to obtain the rotational speed of the shaft. Various speed sensing devices may be used to measure the rotational speed of the shaft. The speed sensing device should be selected such that the maximum possible oscillation frequency resulting from a shear may be detected while operating at the lowest possible shaft speed. The speed sensing device may be contact-based or non-contact based. In some embodiments, a contact-based device may be composed of a phonic wheel assembly, as illustrated in FIG. 3. A phonic wheel 304 having a plurality of teeth 306 distributed around an outer surface thereof may be placed in contact with the rotating shaft 20. A sensor 302 is positioned relative to the phonic wheel 304. The rotating shaft 20 propels the phonic wheel 304, creating pulses that are read by the sensor 302 and converted into revolutions per unit time. The sensor 302 may be a proximity sensor, an optical sensor, an inductive sensor, or any other type of sensor known to those skilled in the art.

In embodiments where both frequency and amplitude modulation are considered for the shaft oscillation signature, the speed sensing device used to obtain the rotational speed of the shaft should consist of a rotating component such as a phonic wheel 304 and a speed sensor 302 where the signal frequency and amplitude are both proportional to the rotational speed, such as a variable reluctance sensor, a magnetic sensor, and an electromagnetic sensor.

In some embodiments, the number of phonic wheel teeth 306 is selected such that the lowest speed signal frequency is at least five times the highest possible oscillation frequency resulting from the shear. In some embodiments, the number of phonic wheel teeth 306 is selected such that the lowest speed signal frequency is at least six times the highest possible oscillation frequency resulting from the shear. In some embodiments, the number of phonic wheel teeth 306 is selected such that the lowest speed signal frequency is at least seven times the highest possible oscillation frequency resulting from the shear. In some embodiments, the number of phonic wheel teeth 306 is selected such that the lowest speed signal frequency is at least eight times the highest possible oscillation frequency resulting from the shear. Other embodiments for the number of teeth 306 of the phonic wheel may also be used in order to ensure that the phonic wheel 304 have enough teeth 306 to sample the highest possible oscillation frequency at the lower possible speed.

In some embodiments, a non-contact device may be composed of a single electronic device, such as a Fast Synchronization Sensor (FSS), which comprises a magnetic dipole keyed to one end of the shaft by means of a non-magnetic holder, in front of which a magnetic encoder sensor is positioned. In other embodiments, a non-contact device comprises a light source, such as a laser or infrared light, that is aimed at the rotating shaft 20 to which one or more pieces of reflective tape have been affixed. As the light source hits the shaft 20, it is reflected off the tape and back to the sensor that converts the reflected light measurements into revolutions per unit time. Other embodiments for sensing the rotational speed of the shaft 20 may also be used.

Figure 4A:
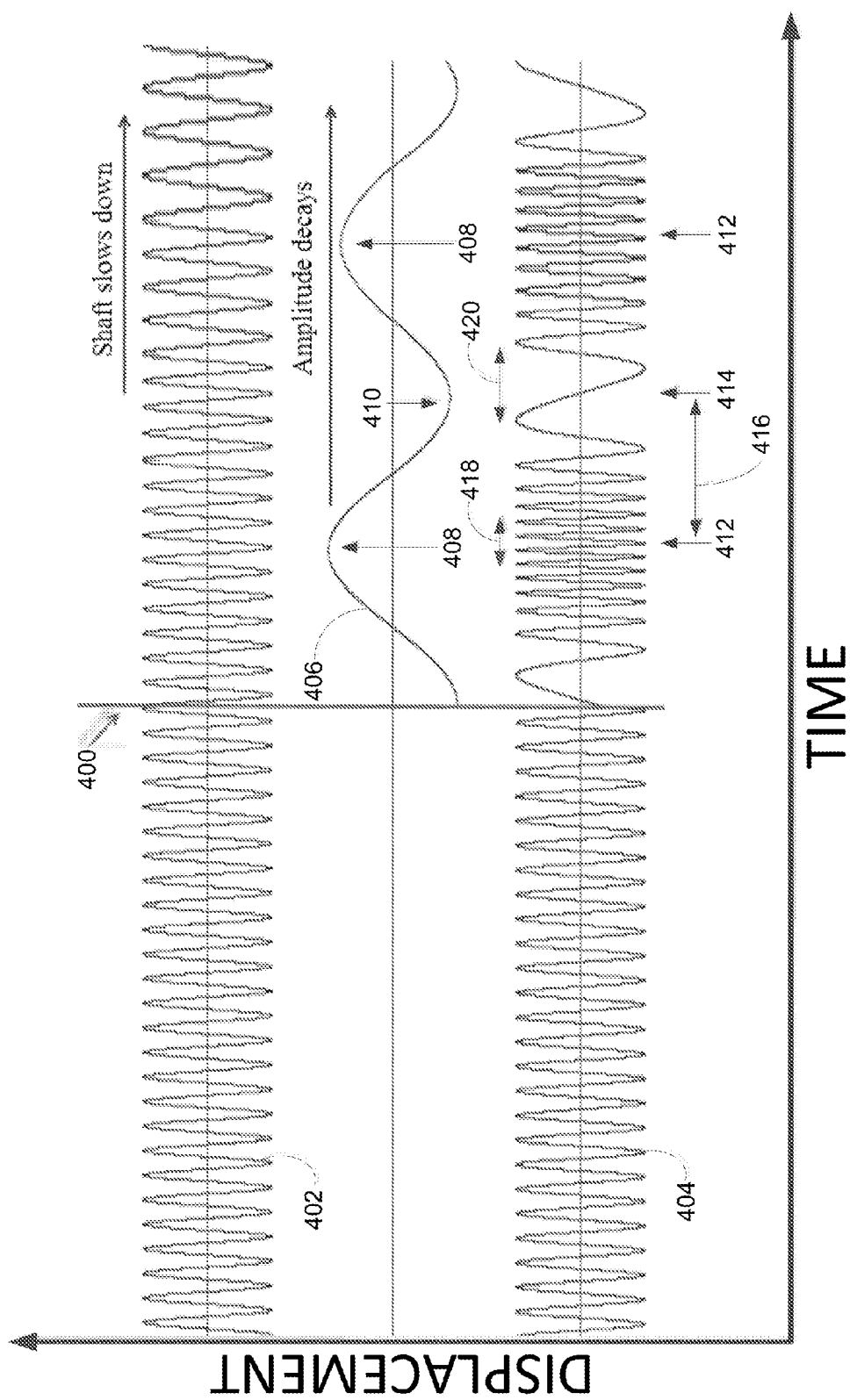
FIG. 4A is an example embodiment of a speed signal resulting from a shaft shear with frequency modulation.

Turning now to FIG. 4A, there is illustrated the carrier wave 402 (or shaft speed) and the resultant modulated waveform 404 before and after a shaft shear event 400. Before the shaft shear event 400, the carrier wave 402 is not modulated by any other waveform and therefore, is identical to the resultant modulated waveform 404. After the shaft shear event 400, an oscillation wave is superimposed on the shaft speed and can be seen as the modulation wave 406. The carrier wave 402 progressively slows as the shaft speed decreases. The resultant modulated waveform 404 is modified by the modulation wave 406. As illustrated, the modulation wave 406 will affect the period, and thus the frequency, of the resultant modulated waveform 404. The instances of highest frequency 412 of the resultant modulated waveform 404 will correspond to the amplitude peaks 408 of the modulating wave 406, while the instances of lowest frequency 414 of the resultant modulated waveform 404 will correspond to the amplitude valleys 410 of the modulating wave 406.

Figure 4B:
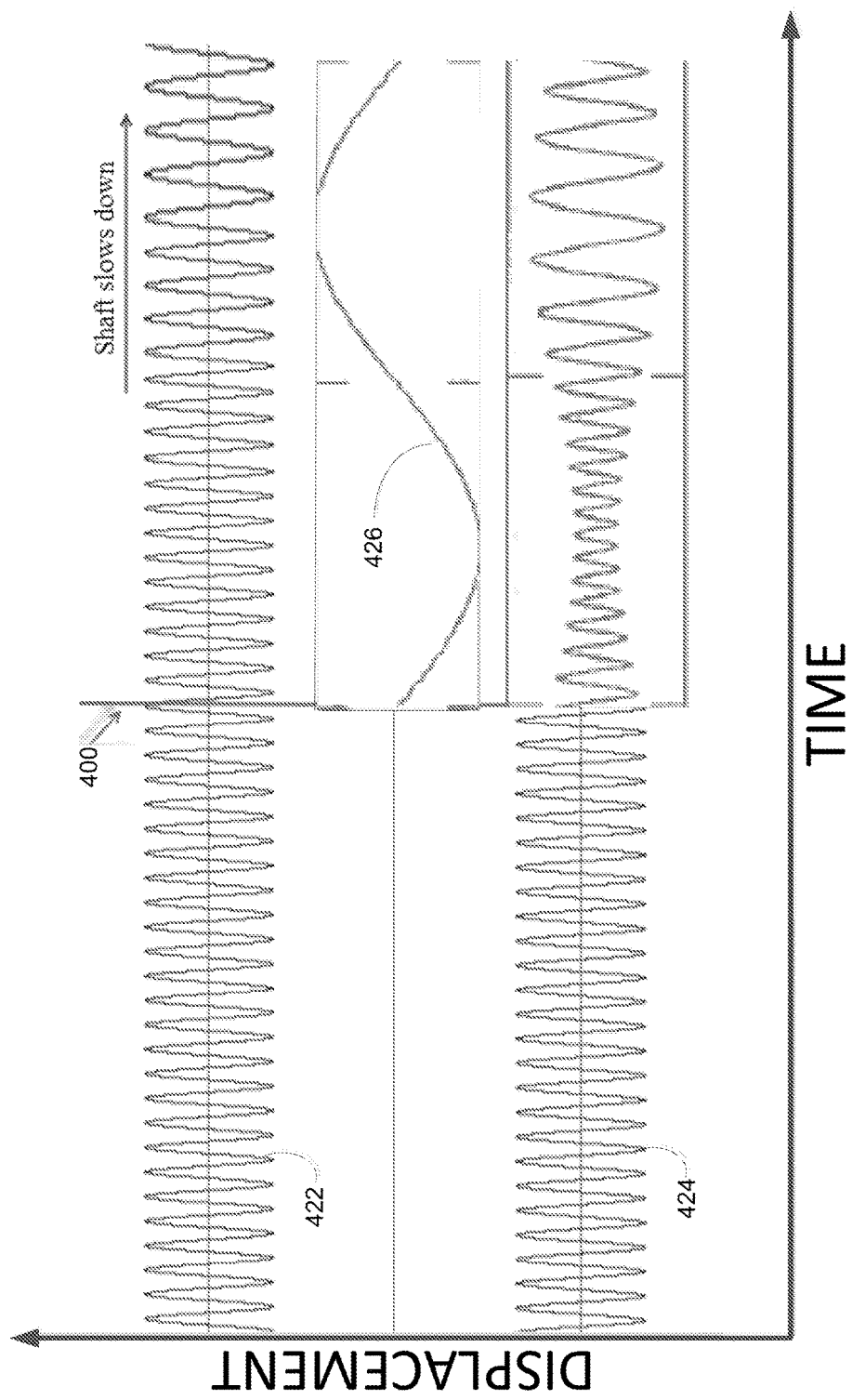
FIG. 4B is an example embodiment of a speed signal resulting from a shaft shear with amplitude and frequency modulation.

Referring to FIG. 4B, there is illustrated another example of the carrier wave 422 (or shaft speed) and the resultant modulated waveform 424 before and after a shaft shear event 400. Before the shaft shear event 400, the carrier wave 422 is not modulated by any other waveform and therefore, is identical to the resultant modulated waveform 424. After the shaft shear event 400, an oscillation wave is superimposed on the shaft speed and can be seen as the modulation wave 426. The carrier wave 422 progressively slows as the shaft speed decreases. The resultant modulated waveform 424 is modified by the modulation wave 426. As illustrated, the modulation wave 426 will affect the frequency and the amplitude of the resultant modulated waveform 424.

Figure 5A:
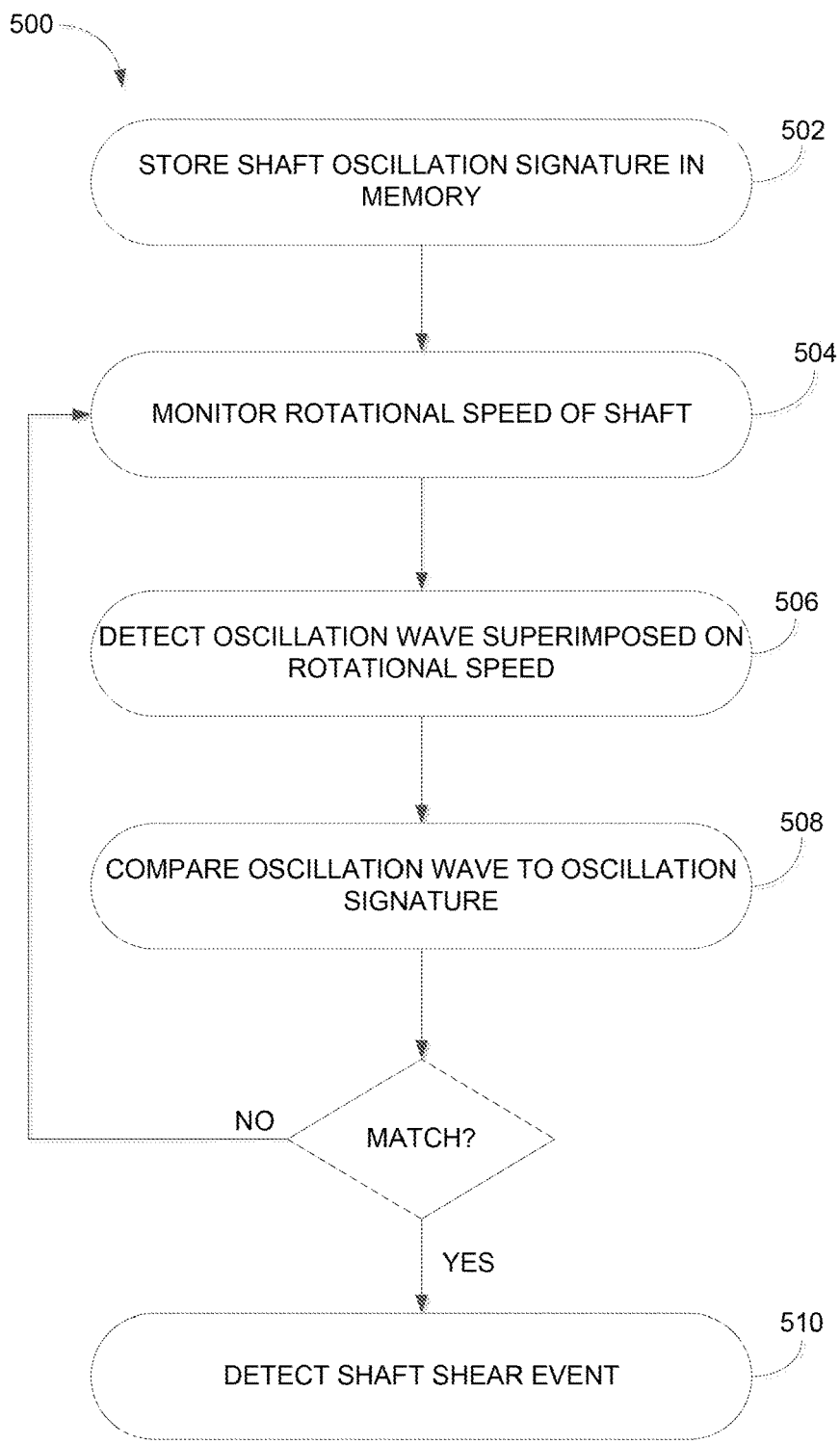
FIG. 5A is a flowchart of a shear shaft detection method, in accordance with a first embodiment.

Referring to FIG. 5A, there is illustrated an embodiment of a method 500 for detecting a shear of a rotating shaft provided between a source and a load. At 502, one or more shaft oscillation signatures are stored in memory. There may be a single shaft oscillation signature stored, or a plurality of shaft oscillation signatures, each one of the plurality corresponding to a specific shaft. Each shaft oscillation signature may be composed of a single modulation frequency, referred to herein as a signature modulation frequency, and a single modulation amplitude, referred to herein as a signature modulation amplitude. Each shaft oscillation signature may alternatively comprise a range of signature modulation frequencies and/or signature modulation amplitudes. At 504, the rotational speed of the shaft is monitored. At 506, an oscillation wave superimposed on the rotational speed is detected. At 508, the oscillation wave and the shaft oscillation signature are compared. When a match is determined, a shaft shear event is detected, as per 510. If there is no match, the method continues to monitor the rotational speed of the shaft, as per 504.

In some embodiments, comparing the oscillation wave and the shaft oscillation signature, as per 508, comprises comparing a signature modulation frequency to a wave modulation frequency and comparing a signature modulation amplitude to a wave modulation amplitude. If the shaft oscillation signature comprises a range of signature modulation frequencies and/or a range of signature modulation amplitudes, then comparing the shaft oscillation wave to the shaft oscillation signature comprises determining if the wave modulation frequency and the wave modulation amplitude fall within the range of signature modulation frequencies and the range of signature modulation amplitudes, respectively.

In some embodiments, the signature modulation frequency and/or amplitude may be composed of an upper and a lower threshold, and comparing the signature modulation frequency/amplitude to the wave modulation frequency/amplitude comprises comparing the wave modulation frequency/amplitude to a minimum and/or maximum frequency/amplitude. Any combination of minimum/maximum and frequency/amplitude may be used as a criteria to detect a shaft shear event. For example, in some embodiments, the shaft oscillation signature comprises a minimum frequency, a maximum frequency, and a single amplitude threshold for a rectified signal. In another example, the shaft oscillation signature comprises a minimum frequency, a maximum frequency, a minimum amplitude and a maximum amplitude. In yet other embodiments, the shaft signature comprises only a minimum frequency and a maximum frequency, or only a minimum amplitude and a maximum amplitude.

In some embodiments, detecting from the rotational speed an oscillation wave, as per 506, comprises determining the wave modulation amplitude and the wave modulation frequency directly from the resultant modulated waveform. For example, this can be done by decomposing the resultant modulated waveform into a carrier wave and a modulation wave and extracting the amplitude and frequency from the modulation wave. The resultant modulated waveform may be represented as follows:

$$y(t) = A_c \cos\left(2\pi f_c t + \frac{f_\Delta}{f_m}\cos(2\pi f_m t)\right)$$

where $A_c$ is the carrier wave amplitude, $f_c$ is the carrier wave frequency, $\Delta f$ is the wave modulation amplitude, and $f_m$ is the wave modulation frequency.

In some embodiments, the resultant modulated waveform may be represented as follows:

$$y(t) = A_c \sin(w_m t)\sin(w_c t + m \cos w_m t)$$

Where $A_c$ is the carrier wave amplitude, $w_c$ is the carrier frequency, $w_m$ is the modulation frequency, and m is the modulation index. The first portion of the expression ($A_c \sin(w_m t)$) represents the amplitude modulating waveform while the second portion of the expression ($\sin(w_c t + m \cos w_m t)$) represents the frequency modulated carrier.

In some embodiments, detecting from the rotational speed an oscillation wave, as per 506, comprises determining the wave modulation amplitude and wave modulation frequency indirectly from the resultant modulated waveform. For example, the method may involve detecting when a period of the resultant modulated waveform reaches below a lower threshold and above an upper threshold. Referring back to FIG. 4A, the carrier swing 416 is the total deviation of the waveform from a highest frequency 412 to a lowest frequency 414. The highest frequency 412 occurs when the period exceeds the upper threshold 418. The lowest frequency 414 occurs when the period falls below the lower threshold 420. The carrier swing corresponds to twice the wave modulation amplitude. The rate of occurrence of the period exceeding the upper threshold 418 and falling below the lower threshold 420 is representative of the wave modulation frequency.

Figure 5B:
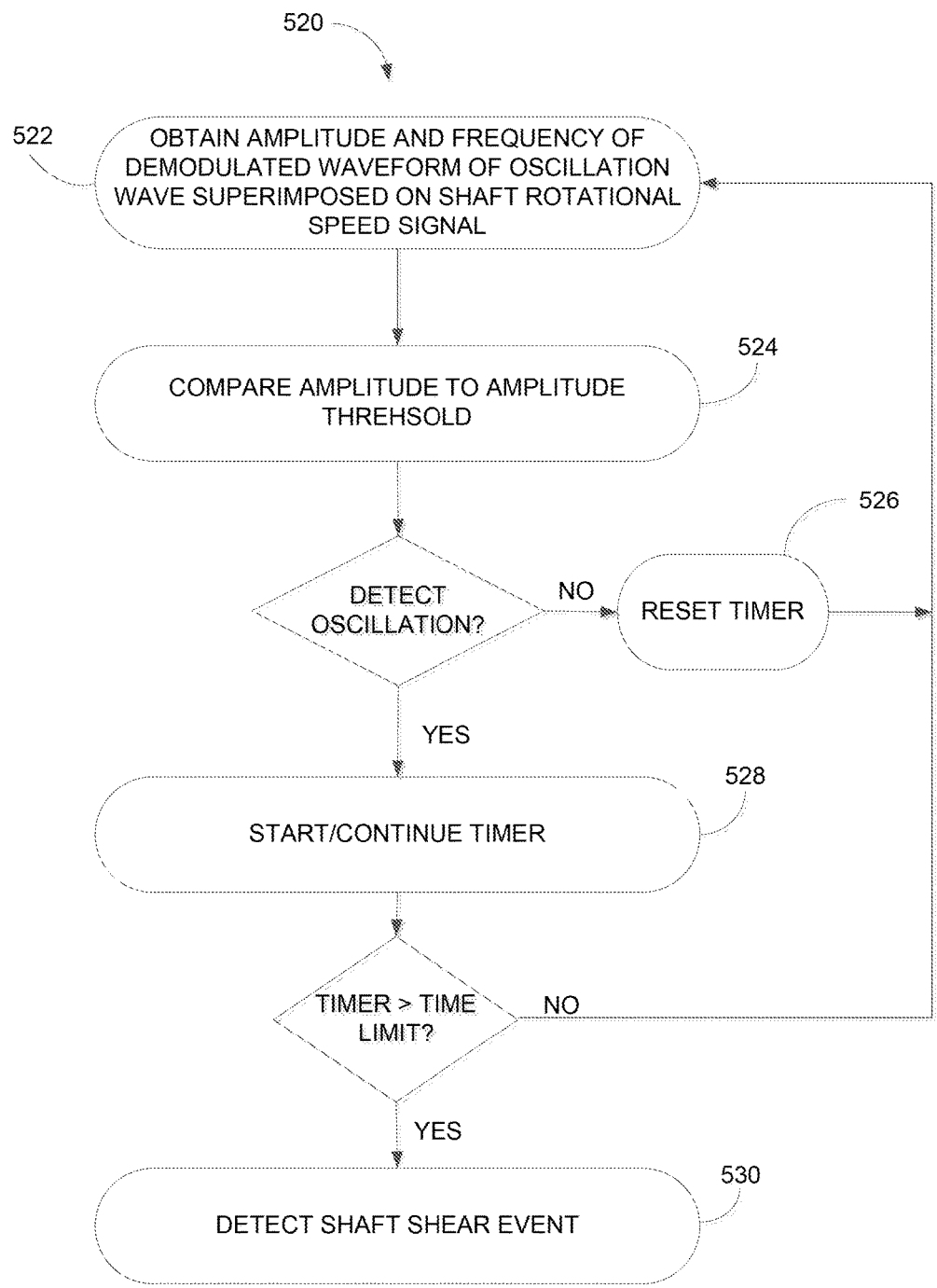
FIG. 5B is a flowchart of a shear shaft detection method in accordance with a second embodiment.

Referring to FIG. 5B, there is illustrated another method 520 for detecting a shear of a rotating shaft provided between a source and a load. At 522, the amplitude and frequency of a demodulated waveform of the oscillation wave superimposed on the shaft speed signal is obtained. The demodulated waveform may be obtained using amplitude demodulation or frequency demodulation. In both cases, the resultant demodulated waveform has an amplitude and a frequency.

The amplitude and/or frequency may be determined as per the methods described herein, such as by decomposing the resultant modulated waveform into a carrier wave and a modulation wave and extracting the amplitude/frequency from the modulation wave, for example using sampling techniques.

At 524, the amplitude is compared to an amplitude threshold for a plurality of samples. In some embodiments, the amplitude threshold comprise an upper and/or lower limit. For example, oscillation is detected when the amplitude of the demodulated waveform is found to be above an upper amplitude threshold and/or below a lower amplitude threshold for a plurality of samples. In some embodiments, only the upper or lower threshold is used while in other embodiments, oscillation is only detected if both the upper and lower thresholds are exceeded.

It may take two or more samples to detect oscillation. For example, oscillation may be detected after 2 samples are found to be above the upper threshold and/or 2 samples are found to be below the lower threshold, or oscillation may be detected when 4, 8, 10, or 14 samples are found to meet these criteria. Other values for the number of samples required to detect oscillation are also contemplated.

Oscillation is indicative of a shaft shear when it continues for a predetermined time. In the case of a detected oscillation, a timer is started at step 528 (or continued if already started). When the timer reaches a time limit, a shaft shear event is detected at step 530. If the timer has not yet reached the time limit, the method 520 returns to step 522 and continues to sample the demodulated waveform. The time limit for detecting the shaft shear event may be determined through testing and/or simulations of shaft shears. In the case of no oscillation, the timer is reset to zero at step 526.

In some embodiments, the time limit corresponds to a number of periods of the modulation wave signal. For example, steps 522 and 524 are performed once for each period, using a plurality of samples per period, and the timer corresponds to a counter that is incremented every time oscillation is detected in consecutive periods. Alternatively, the time limit is set in terms of milliseconds or seconds, and the shaft shear event is detected when oscillation has been detected for a given number of second or milliseconds.

An example is illustrated in Table I below. In this example, the minimum number of samples to detect oscillation is 3, and both an upper and a lower amplitude threshold are used to determine if the oscillation criteria is met. Shaft shear is detected when the oscillation is met for two consecutive periods. As shown, the criteria for oscillation is not met in period 1 and period 2. The criteria for oscillation is met in periods 3 and 4, and the shaft shear is detected after period 4.

TABLE I

|  | Period 1 | Period 2 | Period 3 | Period 4 |
|---|---|---|---|---|
| # samples above upper threshold | 1 | 3 | 3 | 3 |
| # samples below lower threshold | 0 | 2 | 3 | 3 |
| Criteria met for oscillation? | No | No | Yes | Yes |
| Shaft shear detected? | No | No | No | Yes |

The detection methods described herein may be implemented in various manners, such as in software on a processor, on a programmable chip, or on an Application Specific Integrated Chip (ASIC), or as a hardware circuit. In some embodiments, the detection methods are implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as shaft oscillation signatures, amplitudes of a speed sensor signal, and frequencies of a speed sensor signal. In other embodiments, the detection methods are implemented in a digital processor. In some embodiments, the FADEC performs the shutdown of the fuel once a shaft shear event has been detected.

Figure 6:
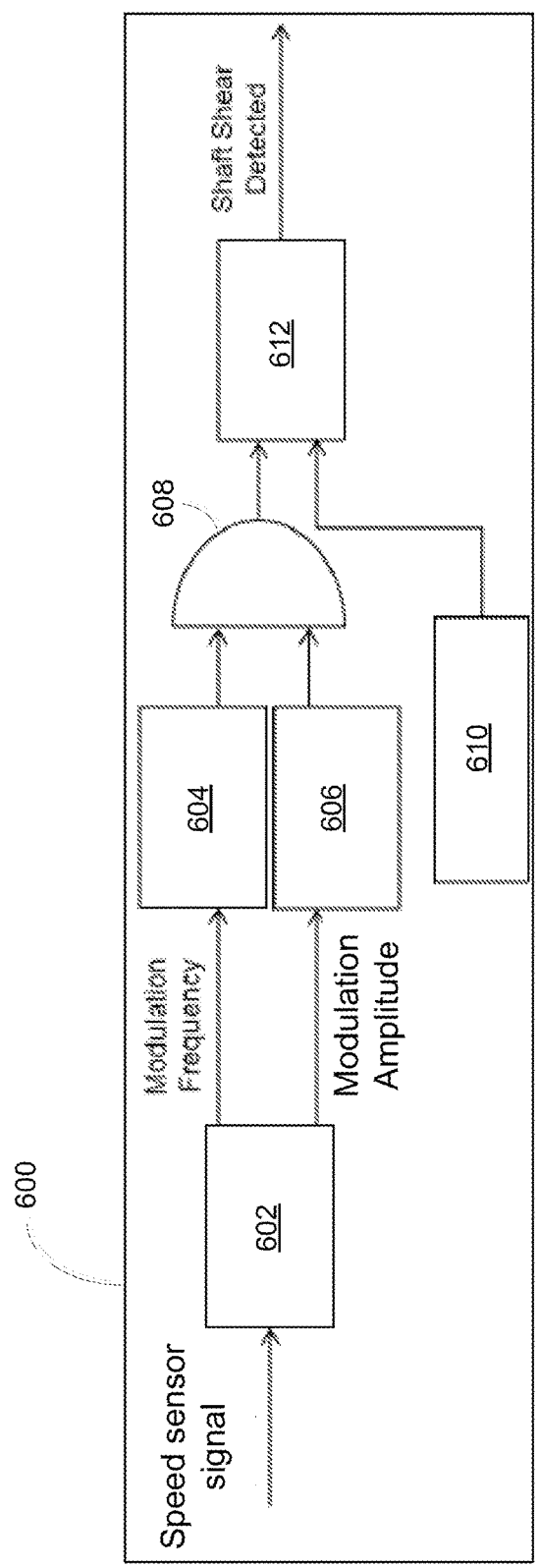
FIG. 6 is a block diagram of an example embodiment of a hardware circuit for implementing the detection methods.

An example embodiment of an implementation in hardware circuitry is illustrated in FIG. 6, for performing method 500. The speed sensor signal may be input to a circuit 600 comprising a demodulator 602 for separating the carrier wave from the modulation wave. The demodulator 602 may be a frequency demodulator or an amplitude demodulator. The resulting waveform has an amplitude and a frequency. The frequency and amplitude of the demodulated waveform are provided to separate range comparators 604, 606, respectively. If both the frequency and the amplitude are found to be within the ranges of the signature modulation frequency and the signature modulation amplitude of the shaft oscillation signature, an AND gate 608 will send a signal to a timer or counter 612. When the timer or counter 612 has reached a predetermined time 610 for confirming a shaft shear event, a shaft shear is detected.

Circuit 600 may also be used for performing method 520 upon minor modifications. In particular, range comparator 604 for the frequency of the demodulated waveform is not needed, and range comparator 606 for the amplitude of the demodulated waveform is replaced with a component for counting samples above and/or below the amplitude threshold. In some embodiments, the AND gate 608 may be used to signal oscillation when both an upper threshold and a lower threshold are exceeded for a given number of samples. The timer or counter 612 is incremented until it reaches a predetermined time 610 for detecting the shaft shear.

The shaft shear detection signal may cause an alarm to ring or a warning message to be transmitted/displayed. The shaft shear detection signal may also trigger a fuel shutoff command or may be used as a fuel shutoff command. Different and/or additional components may also be used in the circuit 600 to perform the detection method as described herein.

Figure 7:
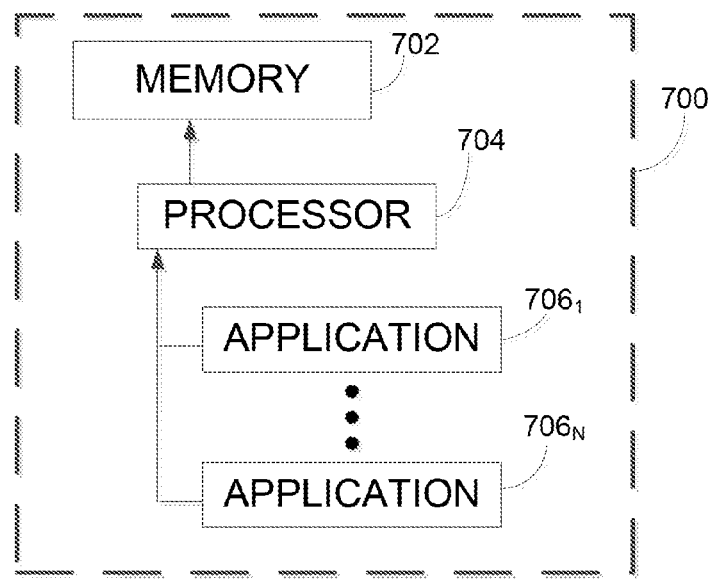
FIG. 7 is a block diagram of an embodiment of the detection methods implemented in software and hardware.

An example embodiment of software and hardware implementation is illustrated in FIG. 7. A system 700 for detecting a shaft shear event may comprise, amongst other things, one or more applications $706_1 \ldots 706_n$ running on a processor 704 coupled to a memory 702. Processor 704 may correspond to a plurality of processors. In addition, while the applications $706_1 \ldots 706_n$ are illustrated and described as separate entities, they may be combined or separated in a variety of ways. The memory 702 accessible by the processor 704 may receive and store data. The memory 702 may be a main memory, such as a high speed Random Access Memory (RAM), or an auxiliary storage unit, such as a hard disk, a floppy disk, or a magnetic tape drive, or any combination thereof. The memory 702 may be any other type of memory, such as a Read-Only Memory (ROM), or optical storage media such as a videodisc and a compact disc. The processor 704 may access the memory 702 to retrieve data. The processor 704 may be any device that can perform operations on data. Examples are a central processing unit (CPU), a front-end processor, a microprocessor, and a network processor. The applications 706₁ ... 706ₙ are coupled to the processor 704 and configured to perform various tasks.

Figure 8:
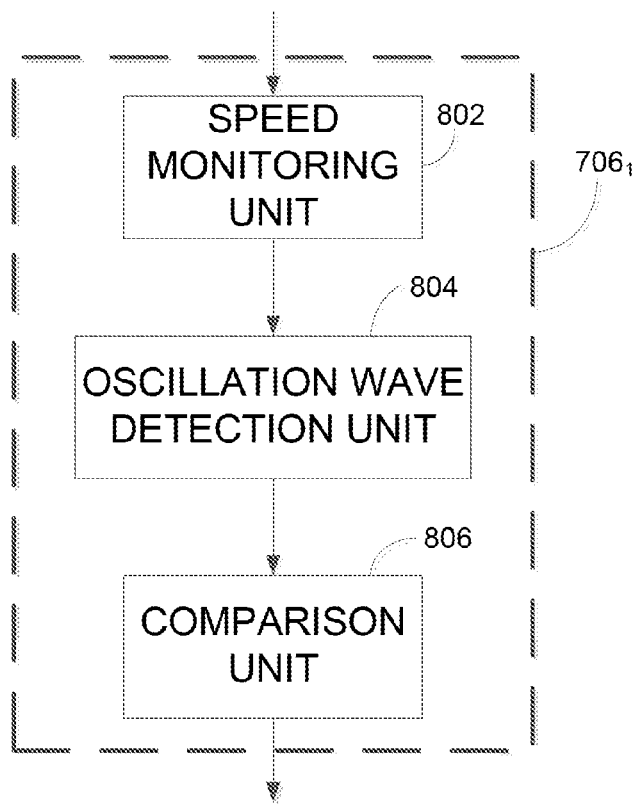
FIG. 8 is a block diagram of an embodiment of an application running on the processor of FIG. 7.

FIG. 8 illustrates an exemplary embodiment of application 706₁ running on the processor 704. The application 706₁ illustratively comprises a speed monitoring unit 802, an oscillation wave detection unit 804, and a comparison unit 806. The speed monitoring unit 802 may be configured to monitor the rotational speed by receiving a speed signal from a speed sensing device, as described above. The oscillation wave detection unit 804 may be configured to detect an oscillation wave superimposed on the rotational speed of the shaft, as per the embodiments described herein. The comparison unit 806 may be configured to compare the shaft oscillation signature to the oscillation wave, as described herein. Once a match is detected, a shaft shear detection signal and/or a fuel shutoff command may be output.

In some embodiments, the detection methods 500, 520 are implemented using a phonic wheel sensing assembly for sensing the rotational speed. The tooth passing time of the phonic wheel may be stored in a buffer. A constant tooth passing time implies a constant speed. When the shaft is sheared, the tooth passing time oscillates with a certain deviation around the tooth passing time immediately before the shear. A processor or circuit monitors each new tooth passing time and compares it with an average of the previous values. If the new passing time sometimes exceeds an upper bound limit and sometimes falls below a lower bound limit, the shaft is determined to be oscillating. A counter is incremented and if the counter exceeds a certain value, shaft shear detection is confirmed.

In some embodiments, the detection methods 500, 520 are combined with other detection methods in order to detect a larger spectrum of torque shaft shears. A torque below a minimum threshold may result in a wave modulation amplitude that is indistinguishable from the speed signal. Therefore, a different detection method may be used for torque levels below the minimum threshold. In some embodiments, the detection methods 500, 520 may comprise monitoring a torque as applied to the shaft and performing the method only when the torque meets the minimum threshold.

The above description is meant to be exemplary only, and one skilled in the art will recognize that changes may be made to the embodiments described without departing from the scope of the invention disclosed. For example, the detection method may be provided on non-transitory computer readable medium having stored thereon program code executable by a processor for performing the method. The blocks and/or operations in the flowchart described herein are for purposes of example only. There may be many variations to these blocks and/or operations without departing from the teachings of the present disclosure. For instance, the blocks may be performed in a differing order, or blocks may be added, deleted, or modified. Still other modifications which fall within the scope of the present invention will be apparent to those skilled in the art, in light of a review of this disclosure, and such modifications are intended to fall within the appended claims.

The invention claimed is:

1. A method for detecting a shear of a rotating shaft of a gas turbine engine, the shaft positioned between a source and a load, the method comprising:
   receiving a speed sensor signal from a speed sensing device;
   determining, from the speed sensor signal, a demodulated waveform of a shaft oscillation wave superimposed on a shaft rotational speed signal, the waveform having an amplitude and a frequency;
   comparing the amplitude of the waveform to an amplitude threshold;
   detecting an oscillation of the shaft when the amplitude threshold is exceeded for a plurality of samples;
   detecting a shear of the rotating shaft when oscillation continues for a predetermined time limit; and
   in response to detecting the shear of the rotating shaft, commanding a fuel shutoff of the gas turbine engine.

2. The method of claim 1, wherein the amplitude threshold comprises a lower amplitude threshold and an upper amplitude threshold.

3. The method of claim 1, wherein the demodulated waveform is obtained through amplitude demodulation.

4. The method of claim 1, wherein the demodulated waveform is obtained through frequency demodulation.

5. The method of claim 1, wherein the speed sensing device comprises a phonic wheel sensing assembly; and wherein the speed sensor signal is received from the phonic wheel sensing assembly.

6. The method of claim 1, wherein the predetermined time limit is measured as a function of a period of the waveform.

7. A system for detecting a shear of a rotating shaft of a gas turbine engine, the shaft positioned between a source and a load, the system comprising:
   a processing unit; and
   a non-transitory computer-readable memory having stored thereon program instructions executable by the processing unit for:
      receiving a speed sensor signal from a speed sensing device;
      determining, from the speed sensor signal, a demodulated waveform of a shaft oscillation wave superimposed on a shaft rotational speed signal, the waveform having an amplitude and a frequency;
      comparing the amplitude of the waveform to an amplitude threshold;
      detecting an oscillation of the shaft when the amplitude threshold is exceeded for a plurality of samples;
      detecting a shear of the rotating shaft when oscillation continues for a predetermined time limit; and
      in response to detecting the shear of the rotating shaft, commanding a fuel shutoff of the gas turbine engine.

8. The system of claim 7, wherein the amplitude threshold comprises a lower amplitude threshold and an upper amplitude threshold.

9. The system of claim 7, wherein the demodulated waveform is obtained through amplitude demodulation.

10. The system of claim 7, wherein the demodulated waveform is obtained through frequency demodulation.

11. The system of claim 7, wherein the speed sensing device comprises a phonic wheel sensing assembly; and wherein the speed sensor signal is received from the phonic wheel sensing assembly.

12. The system of claim 7, wherein the predetermined time limit is measured as a function of a period of the waveform.

13. A non-transitory computer-readable medium having stored thereon program instructions for detecting a shear of a rotating shaft of a gas turbine engine, the shaft positioned between a source and a load, the program instructions executable by a processing unit for:
   receiving a speed sensor signal from a speed sensing device;
   determining, from the speed sensor signal, a demodulated waveform of a shaft oscillation wave superimposed on a shaft rotational speed signal, the waveform having an amplitude and a frequency;
comparing the amplitude of the waveform to an amplitude threshold;
detecting an oscillation of the shaft when the amplitude threshold is exceeded for a plurality of samples;
detecting a shear of the rotating shaft when oscillation continues for a predetermined time limit; and
in response to detecting the shear of the rotating shaft, commanding a fuel shutoff of the gas turbine engine.

* * * * *